United States Patent Office 2,782,470
Patented Feb. 26, 1957

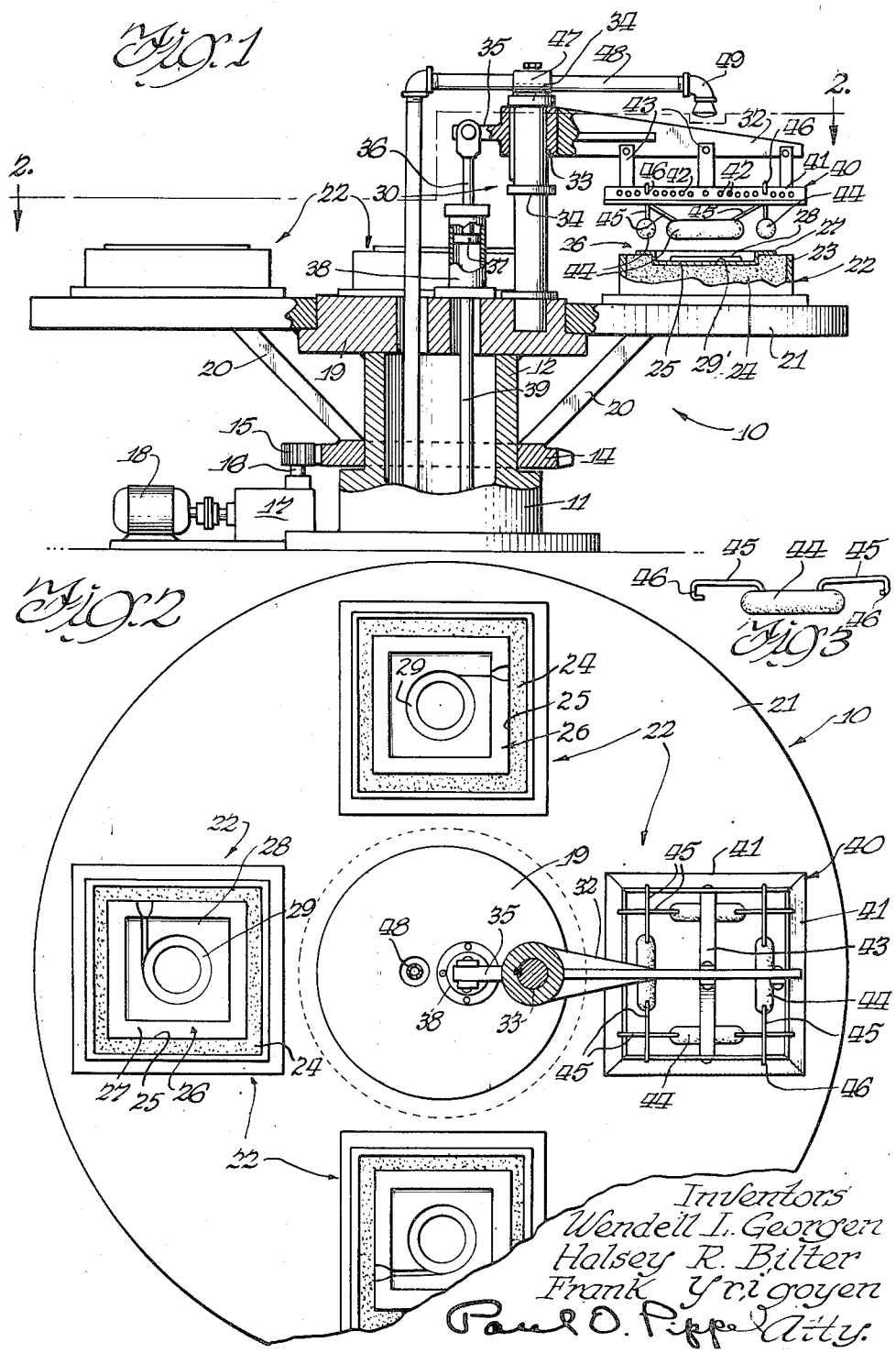

2,782,470

APPARATUS FOR TREATING SHELL-TYPE MOLDS

Wendell L. Georgen, Chicago, Halsey R. Bilter, Evanston, and Frank Yrigoyen, Cicero, Ill., assignors to International Harvester Company, a corporation of New Jersey Application March 4, 1954, Serial No. 414,004

7 Claims. (Cl. 22—9)

This invention relates to an improvement in an apparatus for treating frangible shell-type molds. More particularly it relates to an apparatus for cooling and straightening shell-type molds after the molds have been formed and baked in a curing oven.

In the process known as "shell molding" a resinous mixture is dispersed over a metal pattern. The mixture adheres to the pattern which is then placed in a curing or baking oven whereupon the mold is then baked. The resinous baked mold is frangible and one of the main problems in this type of mold forming has been to keep the mold from becoming distorted and warped during the cooling phase after it has left the baking oven. A shell-type mold has inherent characteristics which during the casting operation produce a very fine casting that can be held to substantially close dimensional tolerances. However warping and distortion, of course, may cause the rejection of many shell molds which might otherwise be used. It is a prime object of this invention to provide an improved apparatus for treating shell-type molds in the heated condition after they have left the baking or curing oven.

A further object is the provision of an improved apparatus capable of rapidly cooling resinous shell-type molds and maintaining said molds in a straightened condition after they leave a curing oven.

Still another object is to provide an improved apparatus for treating shell-type molds after they have left a curing oven, the apparatus including means for applying pressure against certain surfaces of the mold to prevent the same from warping and including a cooling fluid supply device which subjects the mold to a cooling fluid simultaneously with the application of pressure to certain surfaces of said mold.

These and further objects will become more readily apparent from a reading of the specification when examined in connection with the accompanying sheet of drawing.

In the drawings:

Figure 1 is a side elevational view, with certain portions shown in section, of an apparatus for treating shell-type molds;

Figure 2 is a cross-sectional view of a shell mold treating apparatus taken substantially along the line 2—2 of Figure 1; and Figure 3 is a detail elevational view of a pressure applying device used in connection with a shell mold treating machine.

Referring to the drawing, a shell mold treating apparatus is generally designated by the reference character 10. The apparatus 10 comprises a base 11 having an upwardly extending stationary cylindrical support 12. A gear 14 is journaled on the support 12, the said gear 14 being in mesh with a pinion 15 driven by a shaft 16. The shaft 16 projects outwardly from a speed reducing mechanism 17 which is suitably driven by an electric motor 18.

A stationary table 19 is connected to the support 12. A plurality of diagonally extending braces 20 are rigidly secured to the gear 14. A rotatable table 21 is secured to the braces 20. The table 21 is rotatably supported on the stationary table 19. The table 21 includes a plurality of circumferentially spaced shell mold treating stations generally designated at 22.

Each treating station 22 includes a support or box 23 which contains a fire resistant material generally designated at 24. The fire resistant material 24 may be what is commercially known as transite or asbestos. The upper surface of the material 24 is recessed to provide a cavity 25 having the general contour of the outer surface of a shell-type mold which is to be supported on support 23. A shell-type mold is designated 26. The shell type mold 26, is indicated above, is of a frangible nature and may be made of a resinous mixture which has been placed over a pattern plate and subsequently baked in a curing oven (not shown). The shell-type mold 26 includes a plurality of flat edge surfaces 27 and an inner surface 28. As best shown in Figure 2, the inner surface 28 may comprise a suitable cavity 29 to which cast metal may be directed when two shell molds are placed in a complementary assembled position for pouring. The mold 26 also includes an outer surface 29' which, as indicated in Figure 1, conforms to the cavity 25 in the transite or asbestos material 24.

A frame, generally designated at 30, is positioned on the support 11. The frame 30 includes a vertically extending post 31 on which a support arm 32 is positioned for vertical movement. The support arm 32 includes a bearing portion 33 which is adapted to slide vertically between a pair of upper and lower stops 34 provided on the post 31.

An ear 35 projects outwardly from the arm 32 and is connected to a piston rod 36. The piston rod 36 includes a piston 37 reciprocally positioned within a cylinder 38. The cylinder 38 may be suitably subjected to fluid under pressure from a fluid conduit 39 leading to a source of fluid pressure (not shown).

A rectangular bracket 40 is supported on the arm 32. The bracket 40 consists of a plurality of angle members 41 having a plurality of laterally spaced openings 42. Straps 43 are connected to the bracket 40 and to the arm 32 for suitably supporting said bracket.

In Figure 3 a detail of a weighted member 44 is shown. The weighted member 44 may comprise a bag containing shot material having a rather high density. It is, of course, realized that shot is effective for the type of use indicated but any other material such as sand, etc. may be utilized. The bags or weighted members 44 have connected thereto, a plurality of hangers 45, the hangers 45 include hook portions 46 which are adapted, as indicated in Figures 1 and 2, to be inserted in the openings 42 of the angles 41. Thus by inserting the hooks 46 in the said openings 42 the bags 44 may hang from the bracket 40 as best indicated in Figure 1. The plurality of openings 42 permit the placing of the weighted members 44 at different positions to accommodate different types of shell molds which might be utilized.

A conduit support 47, on the post 31, supports a conduit 48 through which a cooling fluid may be directed. The conduit 48 has at one end a spray head 49 which is adapted to direct fluid in a fine spray over the shell mold 26. The conduit 48 may, at its other end, be connected to a suitable source of cooling fluid. The present apparatus 10 is intended to be placed adjacent to a mold making machine for making shell-type molds. As the molds emerge from the curing oven in a heated condition, they are stripped from a pattern plate and are immediately placed in the position indicated on the treating station 22 which is positioned closest to the mold making machine.

The mold 26 has its outer surface 29' placed in the cavity 25 in such a manner that it is firmly supported in the transite material 24. Fluid in the cylinder 38 then is withdrawn from the cylinder permitting the piston 37 to lower the arm 32. The bags or weighted members 44 are now placed in weighted engagement with the flat edge surfaces 27. The pressure exerted by the bags 34 is of a resilient or flexible nature in view of the fact that the shot, which is disposed in each bag 44, is free to relatively move within the bag. Thus it might be said that the pressure which is applied is firm though gentle so that the frangible mold will not crack or be damaged. The bags 44 thus exert an even pressure on edge surfaces of the mold and maintain the mold from becoming warped from the cooling operation. The spray head 49 now is actuated to spray cooling fluid directly on the exposed surfaces of the mold whereby quick and effective cooling is accomplished.

It has been found by this process and apparatus that the mold shells are cooled rapidly with a minimum of distortion and warpage. Thus rejection of defective molds can be held at a minimum. Only one spray head and pressure applying device have been shown on the apparatus. It is of course possible to supply each station with such a device, depending upon the amount of production which is delivered from a mold making machine. After the mold has been sufficiently cooled and straightened and there is little danger of distortion the arm 32 is raised, the liquid spray is stopped and the mold 25 can be removed whereupon the cycle can again be repeated.

It can now be seen that an improved process and apparatus for treating shell-type molds has been disclosed. It must be understood that further changes and certain modifications may be made which do not depart from the spirit of the invention disclosed or the scope thereof as defined in the appended claims.

What is claimed is:

1. Apparatus for cooling and straightening frangible shell-type molds comprising a stationary support, a table rotatably positioned on said support, means connected to said table for rotating the same, a plurality of treating stations circumferentially spaced on said table, each station comprising a mold support, each mold support including an upper surface having a recessed portion conforming generally to the outer contour of a heated shell mold, a frame supported on said support, said frame including a vertically extending post, a support arm positioned on said post for vertical movement, said support arm projecting laterally outwardly from said post and overhanging said treating stations, means connected to said support arm for raising and lowering the same relative to said treating stations, a bracket connected to said support arm, a plurality of flexible weighted members, hangers connected to said weighted members, and means adjustably connecting said hangers to said bracket, said weighted members being adapted during a lowering of said arm to engage and exert a resilient pressure against surfaces of a shell mold supported on said mold support, and a coolant liquid supply conduit supported on said table, said supply conduit including means for spraying coolant on a mold supported on said treating station to effectuate cooling of said mold.

2. Apparatus for cooling and straightening frangible shell-type molds comprising a stationary support, a table rotatably positioned on said support, means connected to said table for rotating the same, a plurality of treating stations circumferentially spaced on said table, each station comprising a mold support, each mold support including an upper surface having a portion conforming generally to the outer contour of a heated shell mold, a frame supported on said support, said frame including a vertically extending post, a support arm positioned on said post for vertical movement, said support arm projecting laterally outwardly from said post and overhanging said treating stations, means connected to said support arm for raising and lowering the same relative to said treating stations, a bracket connected to said support arm, a plurality of weighted members, hangers connected to said weighted members, means adjustably connecting said hangers to said bracket, said weighted members being adapted during a lowering of said arm to engage and exert a pressure against surfaces of a shell mold supported on said mold support, and a coolant liquid supply conduit supported over said table, said supply conduit including means for spraying coolant on a mold supported on said treating station to effectuate cooling of said mold.

3. Apparatus for cooling and straightening frangible shell-type molds comprising a stationary support, a table rotatably positioned on said support, means connected to said table for rotating the same, a plurality of treating stations circumferentially spaced on said table, each station comprising a mold support, each mold support including an upper surface having a portion conforming generally to the outer contour of a heated shell mold, a frame supported on said support, said frame including a vertically extending post, a support arm positioned on said post for vertical movement, said support arm projecting laterally outwardly from said post and overhanging said treating stations, means connected to said support arm for raising and lowering the same relative to said treating stations, a bracket connected to said support arm, a plurality of weighted members, hangers connected to said weighted members, means connecting said hangers to said bracket, said weighted members being adapted during a lowering of said arm to engage and exert an even pressure against surfaces of a shell mold support, and a coolant liquid supply conduit supported for rotation with said table, said supply conduit including means for spraying coolant on a mold supported on said treating station to effectuate cooling of said mold.

4. Apparatus for straightening frangible shell-type molds comprising a stationary support, a table rotatably positioned on said support, means connected to said table for rotating the same, a plurality of treating stations circumferentially spaced on said table, each station comprising a mold support, each mold support including an upper surface having a portion conforming generally to the outer contour of a heated shell mold, a frame supported on said support, said frame including a vertically extending post, a support arm positioned on said post for vertical movement, said support arm projecting laterally outwardly from said post and overhanging said treating stations, means connected to said support arm for raising and lowering the same relative to said treating stations, a bracket connected to said support arm, a plurality of weighted members, hangers connected to said weighted members, and means adjustably connecting said hangers to said bracket, said weighted members being adapted during a lowering of said arm to engage and exert a pressure against surfaces of a shell mold supported on said mold support.

5. Apparatus for cooling and straightening frangible shell-type molds comprising a stationary support, a table rotatably positioned on said support, means connected to said table for rotating the same, a plurality of treating stations circumferentially spaced on said table, each station comprising a mold support, each mold support including a surface having a recessed portion conforming generally to the outer contour of a heated shell mold, a frame supported on said support, said frame including a support arm positioned on said table for vertical movement, means connected to said support arm for raising and lowering the same relative to said treating stations, a bracket connected to said support arm, a plurality of weighted members, hangers connected to said weighted members, means adjustably connecting said hangers to said bracket, said weighted members being adapted during a lowering of said arm to engage and exert pressure against surfaces of a shell mold supported on said mold support, and a coolant liquid supply conduit associated with said table, said supply conduit including means for spraying coolant on a mold supported on said treating station to effectuate cooling of said mold.

6. Apparatus for cooling and straightening frangible shell-type molds comprising a stationary support, a table rotatably positioned on said support, means connected to said table for rotating the same, a plurality of treating stations circumferentially spaced on said table, each station comprising a mold support, each mold support including a surface having a portion conforming generally to the outer contour of a heated shell mold, a frame supported on said support, said frame including a support arm positioned on said table for vertical movement, means connected to said support arm for raising and lowering the same relative to said treating stations, a bracket connected to said support arm, a plurality of weighted members, means adjustably connecting said weighted members to said bracket, said weighted members being adapted during a lowering of said arm to engage and exert a pressure against surfaces of a shell mold support, and a coolant liquid supply conduit, said supply conduit including means for subjecting a mold supported on said treating station to a cooling liquid to effectuate cooling of said mold.

7. Apparatus for cooling and straightening frangible shell-type molds comprising a mold support, said mold support having a supporting surface conforming generally to one surface of a shell mold supported on said support, a frame positioned adjacent said mold support, weighted members adjustably supported on said frame, power actuated means for moving said weighted members in contact with a shell mold on said support to apply a constant pressure on said mold, and means associated with said mold support for subjecting said mold to a coolant liquid to effectuate quick cooling of the same.

References Cited in the file of this patent
FOREIGN PATENTS 1,039,893    France _____ May 20, 1953

OTHER REFERENCES

Page 5, Phenolic Resins for Shell Molding Process, Chemical Division, General Electric Company, Pittsfield, Mass., April 1952.